US012560496B2

(12) United States Patent
Yamamura et al.

(10) Patent No.: US 12,560,496 B2
(45) Date of Patent: Feb. 24, 2026

(54) SENSOR AND SENSOR MANUFACTURING METHOD

(71) Applicants: MERCARI, INC., Tokyo (JP); The University of Tokyo, Tokyo (JP)

(72) Inventors: Ryosuke Yamamura, Tokyo (JP); Yasuaki Kakehi, Tokyo (JP); Changyo Han, Tokyo (JP); Rei Sakura, Tokyo (JP); Keisuke Watanabe, Tokyo (JP)

(73) Assignees: MERCARI, INC., Tokyo (JP); THE UNIVERSITY OF TOKYO, Tokyo (JP)

( * ) Notice: Subject to any disclaimer, the term of this patent is extended or adjusted under 35 U.S.C. 154(b) by 432 days.

(21) Appl. No.: 18/137,889

(22) Filed: Apr. 21, 2023

(65) Prior Publication Data

US 2023/0349777 A1 Nov. 2, 2023

(30) Foreign Application Priority Data

Apr. 28, 2022 (JP) ................................. 2022-074664

(51) Int. Cl.
*G01L 1/20* (2006.01)
*G01L 5/00* (2006.01)
(52) U.S. Cl.
CPC . *G01L 1/20* (2013.01); *G01L 5/00* (2013.01)
(58) Field of Classification Search
CPC ..... G01L 1/18; G01L 1/20; G01L 1/22; G01L 1/2206
See application file for complete search history.

(56) References Cited

U.S. PATENT DOCUMENTS

| | | | | | |
|---|---|---|---|---|---|
| 3,683,307 | A | * | 8/1972 | Patterson | H01C 10/10 |
| | | | | | 136/250 |
| 6,531,951 | B2 | * | 3/2003 | Serban | G01L 1/205 |
| | | | | | 338/47 |
| 7,705,376 | B2 | * | 4/2010 | Ishida | G01N 27/12 |
| | | | | | 257/253 |
| 10,814,493 | B2 | * | 10/2020 | Duchaine | G01L 9/0051 |
| 12,072,249 | B2 | * | 8/2024 | Yamamura | G06F 3/0202 |
| 2005/0109617 | A1 | * | 5/2005 | Ono | B22F 3/114 |
| | | | | | 264/41 |

FOREIGN PATENT DOCUMENTS

| | | | |
|---|---|---|---|
| JP | 2009150738 | * | 7/2009 |
| JP | 2018194387 | A | 12/2018 |

OTHER PUBLICATIONS

JP2009150738 machine translation (Year: 2009).*

* cited by examiner

*Primary Examiner* — Kyung S Lee
(74) *Attorney, Agent, or Firm* — Morgan, Lewis & Bockius LLP

(57) ABSTRACT

A sensor includes: a sensor section including a conductive structure made up of a three-dimensionally continuous unit lattices, each including a plurality of columnar beams; and output connectors that output a resistance value of the sensor section, the resistance value changing at least when the conductive structure is compressed by an external force. A method for manufacturing a sensor includes forming the sensor section by stacking using a 3D printer. The sensor and method for manufacturing the sensor enable the adjustment of the repulsive force against compression to an input member and thus appropriately setting the change in resistance value against external force according to the device, in which the sensor is to be incorporated and the mode of use.

20 Claims, 5 Drawing Sheets

100

110

120

210

200

120

111 z x y (a)

(b)

(a)                              (b)

SENSOR AND SENSOR MANUFACTURING METHOD

CROSS REFERENCE TO RELATED APPLICATION

The present application is based upon and claims the benefit of priority from Japanese Patent Application No. 2022-74664, filed on Apr. 28, 2022, the entire contents of which are hereby incorporated by reference.

BACKGROUND

Field

The present invention relates to a sensor and a method for manufacturing a sensor.

Description of Related Art

Sensors using a material that is deformed by an external force are being developed to detect the external force and magnitude of the external force from the deformation. These sensors are used for many input devices, and have a high affinity with devices that a user pushes or grips, for example. Patent Document 1 (JP2018-194387A) discloses one of these sensors. The sensor measures a resistance value of a porous structure, which is deformable by external force and impregnated with conductive ink to have conductivity, so that the resistance value changes with the deformation of the porous structure. The sensor detects the motion of a user based on the measurement.

SUMMARY

There are high expectations for the application of these sensors that are deformable by compression because once the sensor is assembled well in a device, it detects various motions of the user. The materials that can be used, however, are limited, so that the sensors fail to have expected functions. For instance, when using commercially available foamed materials or porous materials, it is difficult to adjust the amount of deformation caused by external forces. This results in difficulty to correctly set a change in resistance value relative to the external force according to the device in which a sensor is incorporated and the mode of use.

To solve these problems, the present invention provides a sensor enabling the adjustment of a repulsive force against compression of the sensor as an input member and thus appropriately setting the change in resistance value against external force according to the device, in which the sensor is to be incorporated, and the mode of use.

A sensor according to the first aspect of the present invention includes: a sensor section including a conductive structure made up of a three-dimensionally continuous unit lattices, each including a plurality of columnar beams; and output connectors that output a resistance value of the sensor section, the resistance value changing at least when the conductive structure is compressed by an external force.

A method for manufacturing a sensor according to the second aspect of the present invention includes forming the sensor section by stacking using a 3D printer.

The present invention provides a sensor enabling adjustment of the repulsive force against compression of the sensor as an input member and thus appropriately setting the change in resistance value against external force according to the device, in which the sensor is to be incorporated, and the mode of use.

DETAILED DESCRIPTION

Figure 1:
FIG. 1 is a perspective view showing the overall configuration of a sensor according to the present embodiment.
Figure 1:
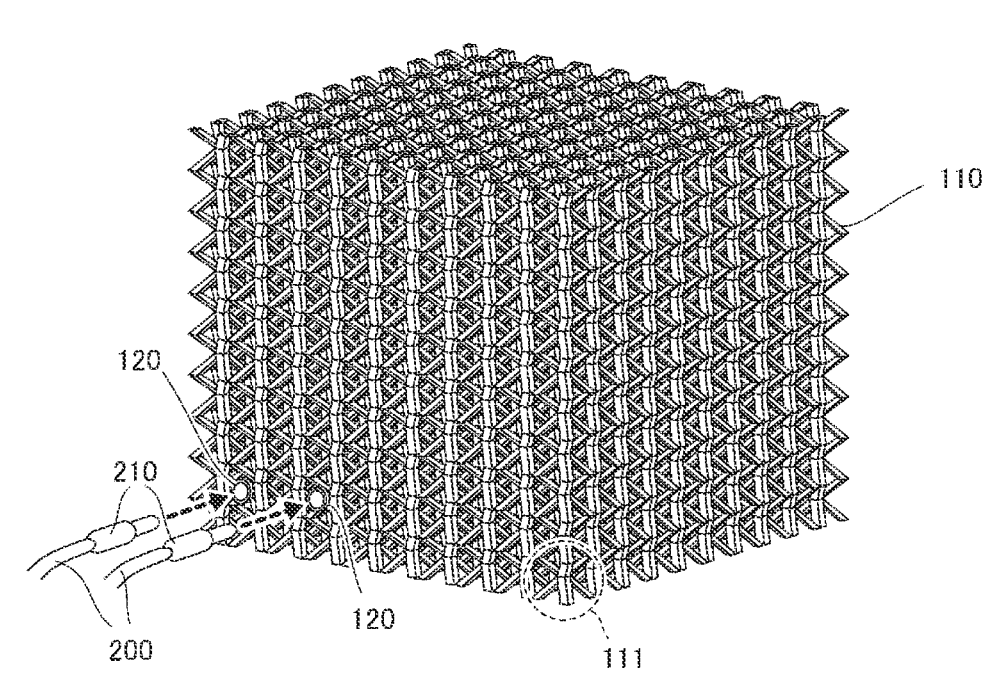

The following describes some embodiments of the present invention, with reference to the attached drawings. In the attached drawings, like numbers indicate like components. When a drawing illustrates a plurality of structures with the same or similar configuration, a reference numeral may be given to some of the structures and may not be given to the other structures, in order to avoid the complexity. Not all of the elements described in the embodiments are indispensable as means for solving the problems.

FIG. 1 is a perspective view showing the overall configuration of a sensor 100 according to the present embodiment. The sensor 100, also known as a soft sensor, includes a soft material as the sensing member. This embodiment describes an example of a cubic sensor with a side of about 30 mm when not subjected to external force.

The sensor 100 mainly includes a sensor section 110 and two output connectors 120. The sensor section 110, which will be described in details later, is a structure made up of three-dimensionally continuous unit lattices 111, each including a plurality of columnar beams. The sensor section 110 deforms in accordance with the magnitude of an external force applied, and has elasticity to return to its original shape as soon as the external force is removed. The output connectors 120 are for outputting a detection signal indicating the resistance value of the sensor section 110 to a detection circuit, and are press-fitted into gaps of the unit lattices 111 to be fixed to the sensor section 110.

Cables 200 transmit a detection signal output from the output connectors 120 to the detection circuit, and each have a connector pin 210 at the end. The connector pin 210 is inserted into and removed from the output connector 120.

As shown in the drawings, x-, y-, and z-axes are defined. That is, the direction in which the output connectors 120 receive their connector pins 210 is x-axis direction, and the direction in which the two output connectors 120 are placed side by side is y-axis direction. The direction orthogonal to x-axis and y-axis is z-axis direction. Some of the following drawings show the same coordinate axes as in the state in FIG. 1, thus indicating the orientation of the structure shown in each drawing.

Figure 2:
FIG. 2 shows the sensor during external force detection.
Figure 2:
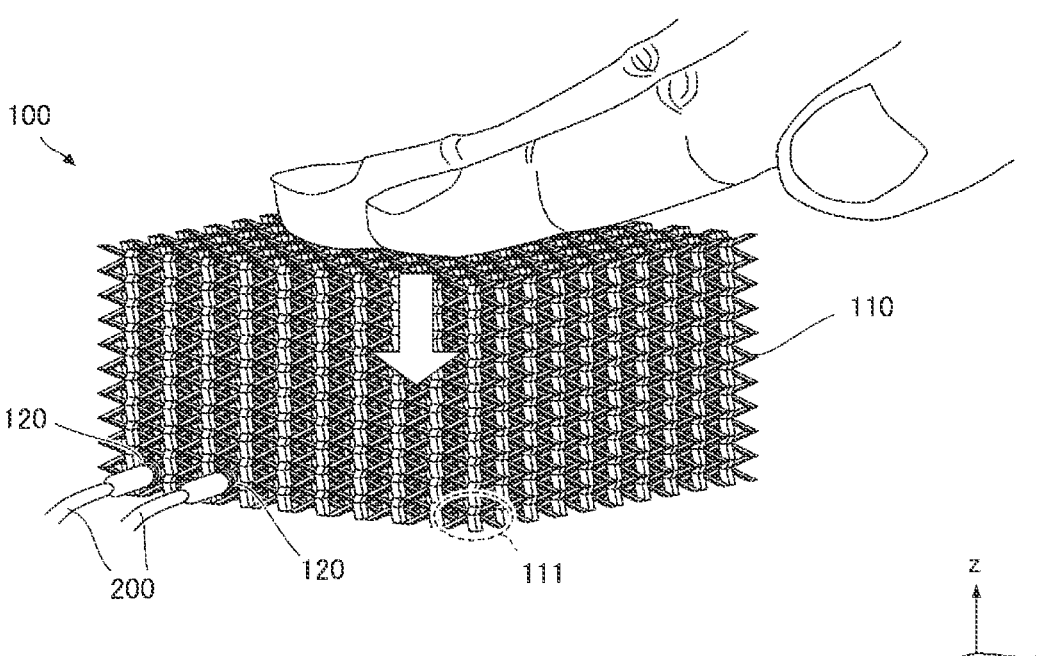

FIG. 2 shows the sensor 100 during external force detection. This embodiment assumes a usage mode in which the user presses the sensor 100 with fingertips.

When the user pressurizes the upper surface (xy plane on the positive side on z-axis) of the sensor 100 downward (in the negative direction on z-axis) as indicated by the white arrow, the mutually connected unit lattices 111 are pressed in z-axis direction, so that the sensor section 110 as a whole is also pressed and compressed in z-axis direction. When the individual unit lattices 111 are pressed in z-axis direction, the contact area between the columnar beams making up the unit lattices 111 increases, so that the resistance value between the two output connectors 120 decreases. The resistance value between the two output connectors 120 is detected by transmitting a detection signal to the detection circuit described below via the cables 200 connected to the output connectors 120.

As the amount of compression of the sensor section 110 by the user's fingertips increases, the contact area between the columnar beams that make up the unit lattices 111 increases, so that the resistance value output from the output connectors 120 decreases. In other words, the sensor section 100 can output different resistance values in response to changes in the state of contact between the columnar beams making up the unit lattices 111 in accordance with the compression by the external force. FIG. 2 shows an example in which the upper surface (the surface on the positive side of z-axis) of the sensor section 100 in z-axis direction is uniformly compressed by fingertips. The upper surface may not be uniformly compressed, and at least the contact portion with fingertips may be shrunk and compressed in z-axis direction. That is, the portion of the upper surface of the sensor 100 in contact with the fingertips may be compressed more downward in z-axis direction (in the z-axis negative direction) than other portions of the upper surface.

Figure 3:
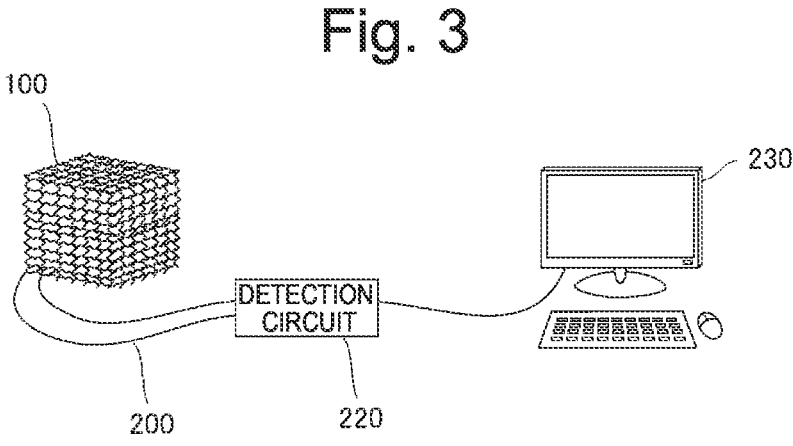
FIG. 3 shows an example of the configuration of a sensor system that uses a detection signal from the sensor.

FIG. 3 shows an example of the configuration of a sensor system that uses a detection signal from the sensor 100. The cables 200 each having one end connected to the sensor 100 are connected to a detection circuit 220 at the other ends. The detection circuit 220 includes a resistance-value detection circuit and detects the resistance value of the sensor 100 from the detection signal received via the cables 200.

The detected resistance value is A/D converted and passed to a controller 230 in the form of a digital signal. For instance, the controller 230 is a personal computer (PC), which can control software or other devices according to the detected resistance value. The sensor 100 can also be used as an ON/OFF switch by programming so as to turn OFF when the detected resistance value is greater than or equal to a preset threshold value, and to turn ON when the detected resistance value is less than the preset threshold value.

The controller 230 is not limited to a PC, which may be a portable terminal such as a smartphone or gaming device, an electrical appliance such as a vacuum cleaner, a robot, or a mobile body such as a car. In other words, the controller 230 may be any device that acquires a digital signal of a resistance value and controls operations, actions, etc. according to this digital signal. The detection circuit 220 may be included in the controller 230 or in the sensor 100. The sensor 100 and detection circuit 220 may be incorporated into the controller 230.

Figure 4:
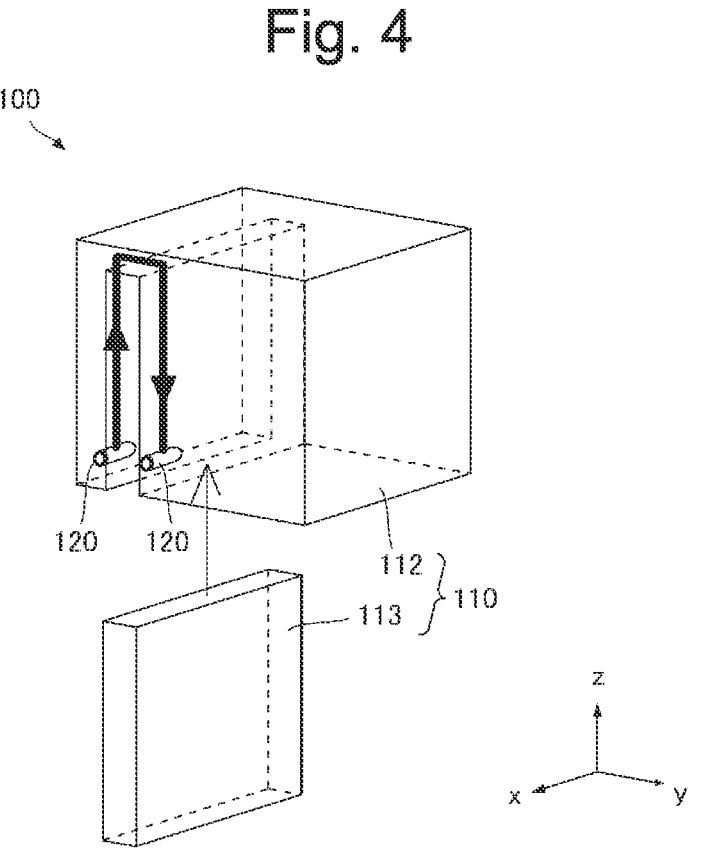
FIG. 4 is a conceptual diagram illustrating the conductive path of the sensor section.

FIG. 4 is a conceptual diagram illustrating the conductive path of the sensor section 110. In the example shown in FIGS. 1 and 2, the sensor 100 according to this embodiment has two output connectors 120 placed side by side on one side face. If the entire sensor section 110 is a conductive structure, the straight line connecting the two output connectors 120 will be the shortest conductive path. In this case, the amount of change in resistance value is very small when the sensor section 110 is compressed in z-axis direction. Preferable sensors have a larger amount of change in output relative to a change in input because it facilitates signal processing. It is therefore preferable to place one output connector 120 and the other output connector 120 near the vertexes that are diagonal to each other, for example, in a cubic shape. The output connectors 120 placed in such a way, however, result in the cables 200 connected to them that are pulled out in radial directions that are opposite to each other with respect to the sensor section 110. This not only impairs the user's operability but also makes the routing of the cables 200 complicated. Therefore, it is desirable that the two output connectors 120 are placed on a same side face to be close to each other.

Thus, in the sensor 100 of the present embodiment, the sensor section 110 includes a conductive structure 112 and a non-conductive structure 113 to keep a conductive path of some length and to place the two output connectors 120 to be close to each other. The conductive structure 112 includes the unit lattices 111 that are three-dimensionally continuous, and has conductivity. The unit lattices 111 of the conductive structure 112 are formed using flexible filament made of, for example, thermoplastic polyurethane (TPU) mixed with conductive filler.

The non-conductive structure 113 also includes the unit lattices 111 that are three-dimensionally continuous, but has electrical insulating property. The unit lattices 111 of the non-conductive structure 113 are formed using flexible filament made of, for example, TPU not mixed with conductive filler. The sensor section 110 is formed by integrating the conductive structure 112 and the non-conductive structure 113 adjacent to each other, and TPU, which has excellent elasticity and toughness, is preferable as a material of the sensor section 110 which is repeatedly compressed.

More specifically, as shown in FIG. 4, the sensor section 110 has a slit-like space extending from the lower end surface (the xy plane on the negative side of z-axis) between the two output connectors 120 of the conductive structure 112, and the non-conductive structure 113 is inserted into the space. FIG. 4 shows the overall shapes of the conductive structure 112 and the non-conductive structure 113 by straight lines, and omits the unit lattices 111.

The non-conductive structure 113 inserted in this way does not make the straight line connecting the two output connectors 120 a conductive path, and the path bypassing the non-conductive structure 113 serves a conductive path as indicated by the bold line. Such a conductive path passes through more unit lattices 111, which increases the difference in resistance value between when the sensor section 110 is compressed and when it is not compressed, and thus makes it easier to detect the amount of change in resistance value relative to the amount of compression. Thus, even in the case of a slight compression, the sensor detects the pressure more precisely. In particular, the conductive path in FIG. 4 is preferred for the usage mode of user's compression of the sensor section 110 in z-axis direction as shown in FIG. 2 because of its long distance in z-axis direction.

Figures 5, 6:
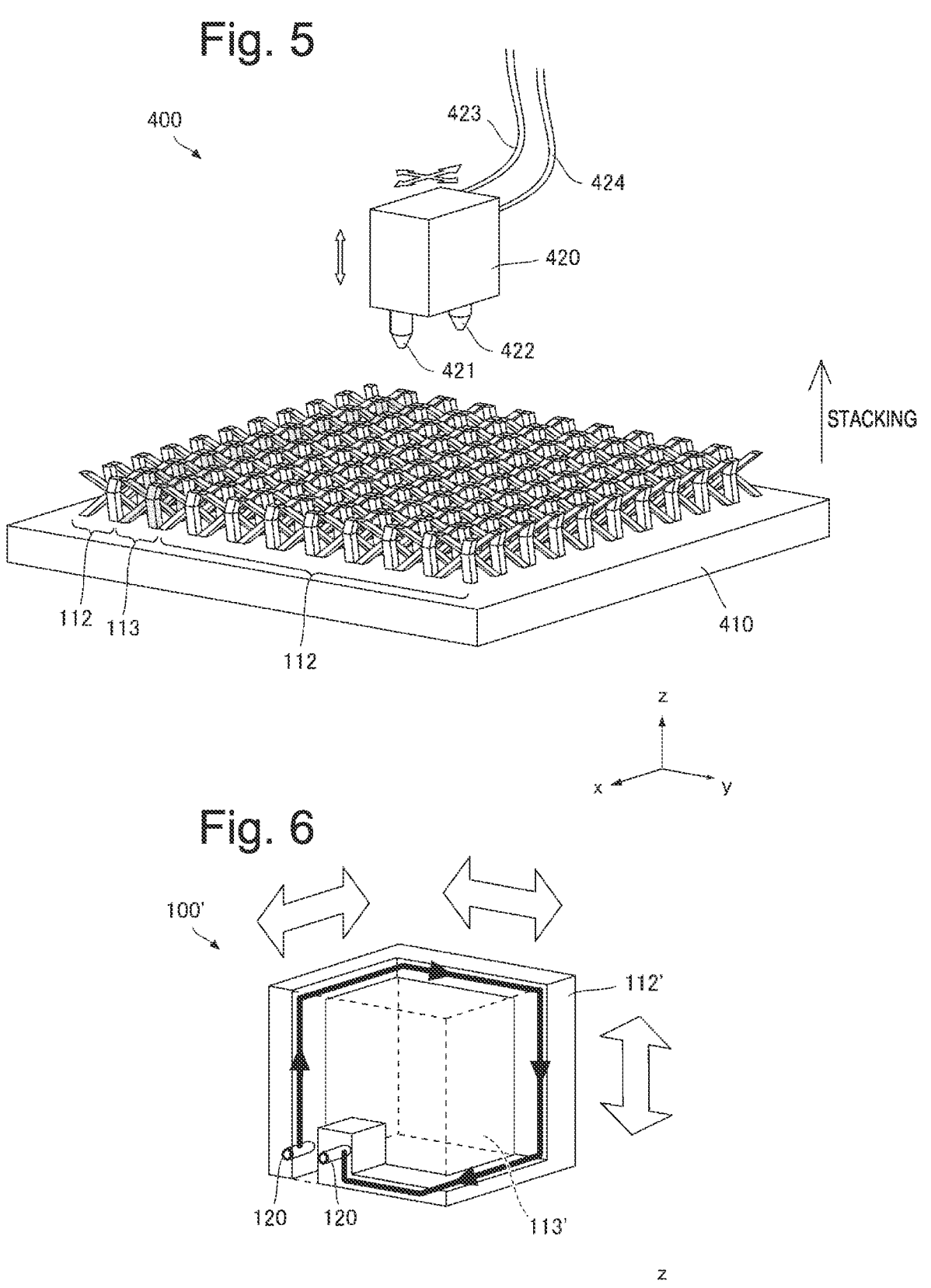
FIG. 5 shows how the 3D printer is used to manufacture the sensor.
FIG. 6 shows a method of setting to extend the conductive path of the sensor section.

While the sensor section 110 may be made by separately forming the conductive structure 112 and the non-conductive structure 113, and then inserting the non-conductive structure 113 into the slit of the conductive structure 112 for fixing as shown in FIG. 4, the present embodiment integrally forms the sensor section 110 using a 3D printer. FIG. 5 shows how a 3D printer 400 is used to manufacture the sensor 100. Specifically, the drawing shows a process of stacking to form the sensor section 110 by the 3D printer 400. The method of manufacturing the sensor 100 with the 3D printer 300 is not limited to the stacking, and any method such as stereolithography may be used.

The 3D printer 400 includes a stage 410 and a head 420 as shown, and controls the head 420 by a controller (not shown) to make the sensor section 110 on the stage 410. As indicated by the white arrows, the head 420 is movable relative to the stage 410 in xy direction (planar direction) and z-axis direction (height direction).

The head 420 includes a conductive material nozzle 421 and a non-conductive material nozzle 422 directed toward the stage 410. The conductive material nozzle 421 heats and melts the conductive flexible filament 423 by the head 420 supplied to the head 420 for discharging. The non-conductive material nozzle 422 heats and melts the non-conductive flexible filament 424 by the head 420 supplied to the head 420 for discharging. The discharge positions and amounts of the conductive material ejected from the conductive material nozzle 421 and the non-conductive material ejected from the non-conductive material nozzle 422 are controlled by the controller.

The 3D printer 400 discharges the conductive material and the non-conductive material by a predetermined height from the surface of the stage 410 upward (z-axis positive direction) for solidification. The 3D printer 400 repeats this for stacking to form the sensor section 110. More specifically, according to the CAD data, the conductive material nozzle 421 discharges the conductive material at the position where the unit lattices 111 making up the conductive structure 112 are to be formed, and the non-conductive material nozzle 422 discharges the non-conductive material at the position where the unit lattices 111 making up the non-conductive structure 113 are to be formed.

In this embodiment, the conductive flexible filament 423 is made of TPU mixed with conductive filler, and the non-conductive flexible filament 424 is made of TPU not mixed with conductive filler, as described above. Materials are not limited to these. Any material that is resilient and tough and forms the unit lattices 111 can be used. For instance, one of the conductive structure 112 and the non-conductive structure 113 may be made of a polyurethane-based material, and the other may be made of a polyester-based material.

Next, the following describes a method of setting the conductive path. FIG. 6 shows a sensor 100' that differs from the sensor 100 described above and shows a method of setting to extend the conductive path. In this drawing, the portion of the cube indicated with solid lines is a conductive structure 112' and the remaining portion is a non-conductive structure 113'. The conductive structure 112' has a three-dimensional shape that traces the cube along a ridge line from one end, where one output connector 120 is placed, to the other end, where the other output connector 120 is placed, while extending in z-axis positive direction, x-axis negative direction, y-axis positive direction, z-axis negative direction, x-axis positive direction, and y-axis negative direction.

The conductive structure 112' having such a three-dimensional shape allows setting of a conductive path extending in three axial directions as indicated by the thick line. Such a conductive path enables a relatively long conductive path in x-axis direction, y-axis direction, and z-axis direction. The sensor therefore detects compression both in x-axis direction and in y-axis direction with high accuracy as well as in z-axis direction as shown in FIG. 2. That is, the sensor 100' detects the user's motion regardless of where the sensor 100' is deformed. Thus, it is preferable to set such a conductive path when manufacturing sensors that are expected to be compressed in the three axial directions.

The structure of the sensor section to set a longer conductive path is not limited to this. The sensor section may be configured so that a non-conductive structure intervenes inward from the end of the conductive structure to make the distance of the conductive path between the output connectors 120 longer than the configuration without a non-conductive structure interposed. The conductive structure and the non-conductive structure may have complicated shapes. A method of integrally stacking the sensor section using a 3D printer allows such a sensor to be manufactured relatively easily. For instance, a sensor section having a spiral-shaped conductive structure can be manufactured with a 3D printer.

The sensor 100 and sensor 100' are configured to have the non-conductive structure 113 interposed between the conductive structure 112 to extend the conductive path. The non-conductive structure can be used for other purposes, not just for extending a conductive path. For instance, some sensors require the conductive structure not to be exposed to the environment. In this case, the entire perimeter of the conductive structure may be covered with a non-conductive structure.

Figure 7:
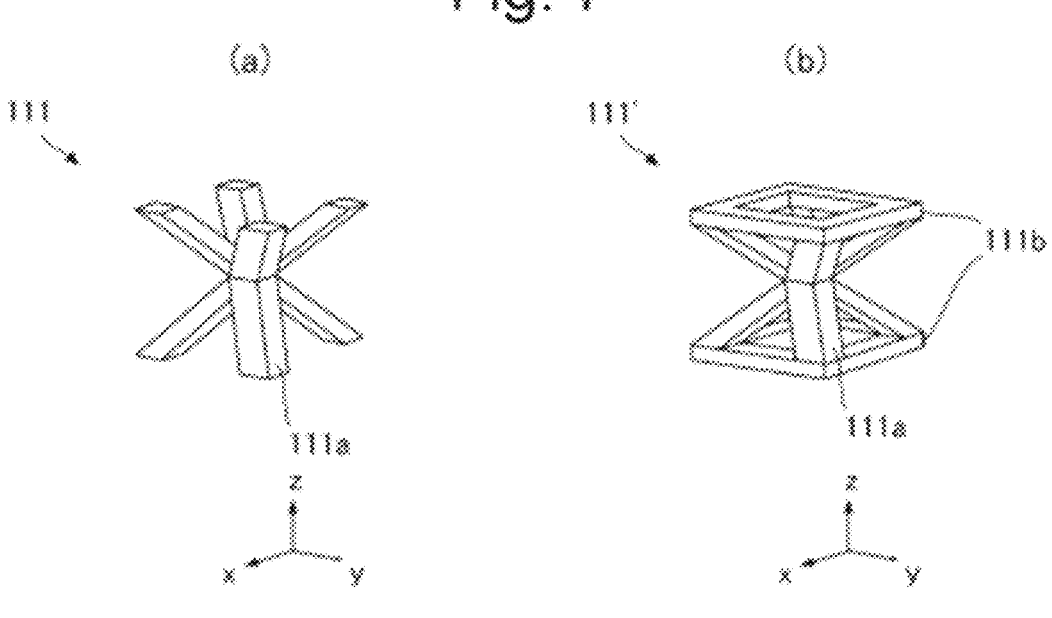
FIG. 7 explains a unit lattice.

Next, the following describes a unit lattice. FIG. 7 explains a unit lattice. Specifically, FIG. 7(*a*) is a perspective view of a unit lattice 111 of the sensor section 110, and FIG. 7(*b*) is a perspective view of a unit lattice 111' in another example.

The unit lattice 111 is configured so that skeletal columnar beams 111*a* extends radially from the center of a cube with one side of 5 mm to the vertexes, which are lattice points, and the skeletal columnar beams 111*a* are inscribed in the cube. The unit lattice 111' is configured to include, in addition to the skeletal columnar beams 111*a* in the cube with one side of 5 mm, a frame columnar beam 111*b* serving as a frame connecting the vertexes of the upper surface (xy plane on the z-axis positive side) and a frame columnar beam 111*b* also serving as a frame connecting the vertexes of the lower surface (xy plane on the z-axis negative side).

A unit lattice, also called a lattice, has multiple columnar beams extending three dimensionally within a lattice space (e.g., a cube) that serves as a repeating unit. When being continuous three dimensionally, at least a part of the columnar beams abutting at their boundary is connected. The columnar beams may extend obliquely relative to the unit lattice as shown in the skeleton columnar beams 111*a*, and may extend in a curved shape instead of in a straight line. They may have a cross-sectional shape that changes along the extending direction.

The size of the lattice space, the pattern of columnar beams, and the thickness of columnar beams may be changed, whereby physical properties, including the elasticity of the sensor section and the amount of change in resistance value during compression, can be adjusted. For instance, the columnar beams may be thicker or placed in large numbers. This makes the amount of compression smaller with a larger pressing force, so that the sensor section will provide an overall harder feel. The pattern of the columnar beams may be designed so that the adjacent columnar beams come in close contact with a slight deformation. This enhances the contact sensitivity of the sensor section.

Figure 8:
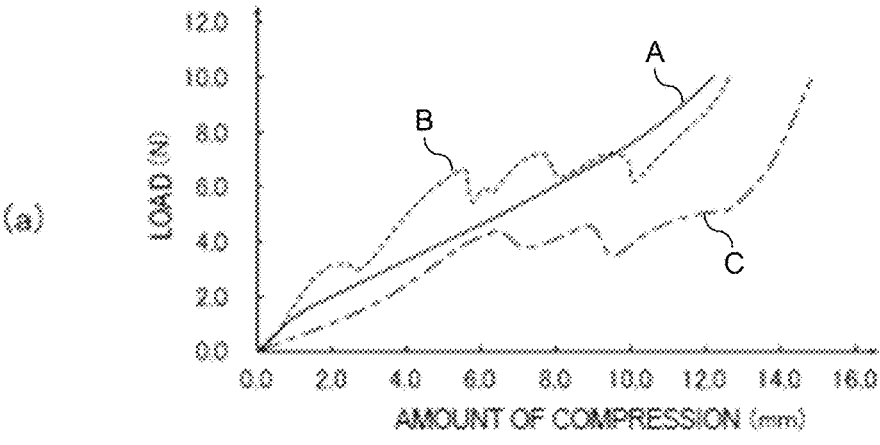
FIG. 8 shows the physical properties of different unit lattices.
Figure 8:
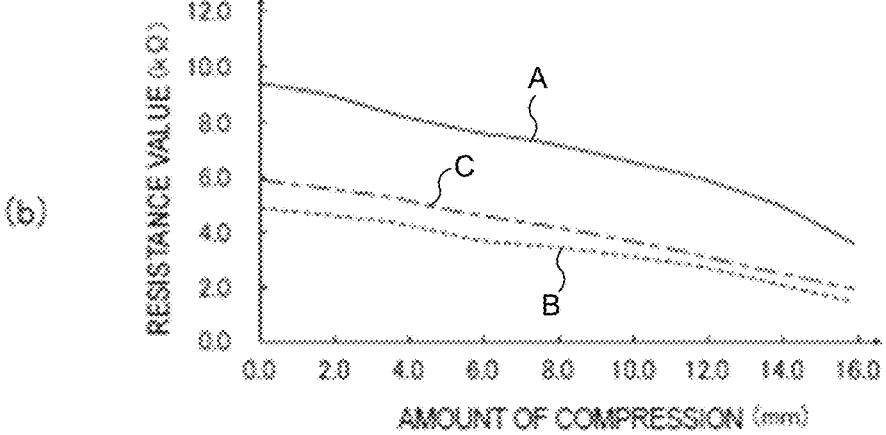

FIG. 8 shows the physical properties of different unit lattices. Specifically, FIG. 8(*a*) shows the change in load (N) versus the amount of compression (mm), and FIG. 8(*b*) shows the change in resistance value (k (2) versus the amount of compression. The solid line indicates the change of the sensor section A made up of the unit lattices 111 shown in FIG. 7(*a*), the dotted line indicates the change of the sensor section B made up of the unit lattices 111' shown in FIG. 7(*b*), and the dotted chain line indicates the change of the sensor section C made up of the unit lattices 111' shown in FIG. 7(*b*) with one side changed to 6 mm in size. All of them are based on the actual measurements. All of the sensor sections have a cubic shape with one side of 30 mm in size, and has a non-conductive structure as shown in FIG. 4. As shown in FIG. 2, they are compressed downward (z-axis negative direction).

According to FIG. 8(*a*), the sensor section A made up of the unit lattices having skeletal columnar beams only shows a linear change in load with respect to the amount of compression. The sensor sections B and C made up of the skeletal columnar beams and the frame columnar beams show a wave-like change. Meanwhile, according to FIG. 8(*b*), the resistance value of each sensor section gradually decreases as the amount of compression increases. Note that the sensor sections B and C, having a high degree of occupation by the columnar beams in the lattice space, have smaller resistance values with respect to the same amount of compression than the sensor section A.

When the sensor section is formed using a 3D printer as in the present embodiment, it is easy to adjust the physical properties to meet user's demands, for example. For instance, users' preferences regarding elasticity may be collected via the internet in the form of a questionnaire, and the 3D printer may automatically select a unit lattice having elasticity corresponding to the collected results to form the sensor section. The 3D printer may accept data specified by the manufacturer, such as on the elasticity or the amount of change in resistance value, and automatically select a unit lattice suitable for that specification to form the sensor section. In this case, the 3D printer may store information on different unit lattices each in association with the elasticity or the amount of change in resistance value, and select a unit lattice corresponding to the acquired data, such as on the elasticity or the amount of change in resistance value, to form the sensor section.

In the sensor 100 described above, the sensor section 110 is cubic in shape. The shape of the sensor section can be changed in various ways depending on the intended use of the sensor, as long as the unit lattices are configured three-dimensional continuously. In particular, the surface of the sensor section need not be the boundary of the unit lattices, and the unit lattices may be divided on the surface. This means that a part of the sensor section may be curved or the sensor section as a whole may be spherical.

Figure 9:
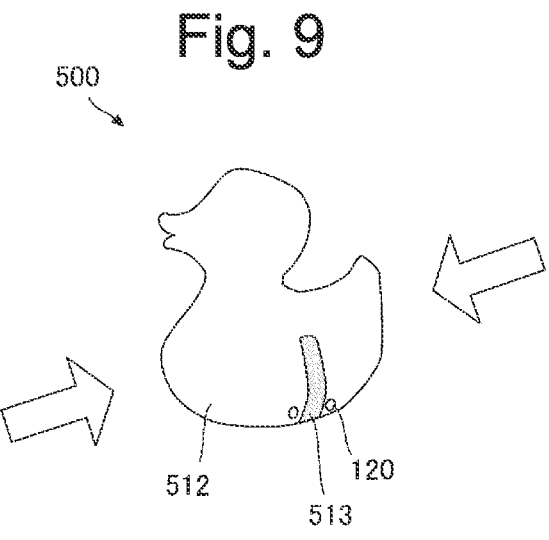
FIG. 9 is an overall view of the sensor according to a first application example.

Then, the following describes some application examples of the sensor 100 in the present embodiment. The drawings for the following application examples illustrate the overall shape while omitting their unit lattices. FIG. 9 is an overall view of the sensor 500 according to a first application example. The sensor 500 has a duck-like outer shape as a whole and is small enough to fit in both palms of an adult. The sensor 500 is served as a child's toy, for example.

The sensor 500 is almost entirely formed of a conductive structure 512, and a non-conductive structure 513 intervenes at a position corresponding to the abdomen of the duck so as to be inserted from below. The two output connectors 120 are placed adjacent to each other on a side face of the abdomen with the non-conductive structure 513 interposed therebetween. The sensor 500 is connected to a detection circuit and a controller via cables (not shown) connected to the output connectors 120. For example, when the sensor 500 is compressed in the direction indicated by the white arrows, the controller detects the change in the resistance value to emit a sound that imitates the quacking of a duck. The loudness of the duck's quack can be changed according to the extent to which the sensor 500, having the shape of a duck, is compressed.

Figure 10:
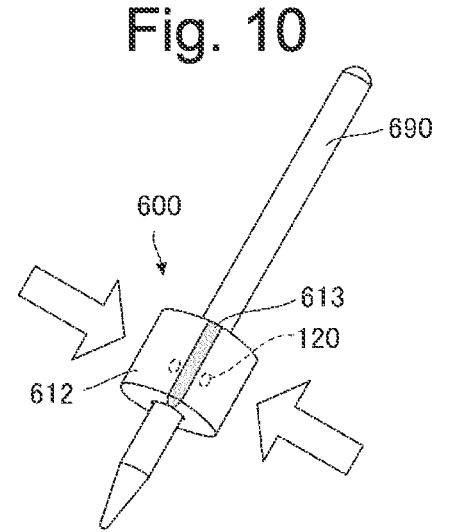
FIG. 10 is an overall view of the sensor according to a second application example.

FIG. 10 is an overall view of a stylus pen 690 with a sensor 600 incorporated, according to a second application example. For instance, the stylus pen 690 is a device that is wirelessly connected to a tablet terminal and that transmits movement of the pen tip in accordance with user's operation to the tablet terminal.

The sensor 600 has an overall cylindrical shape and is attached to a grip of the stylus pen 690. The sensor 600 is almost entirely formed of a conductive structure 612, and a non-conductive structure 613 intervenes to be inserted at a part of the cylindrical shape corresponding to a certain central angle. The two output connectors 120 are placed adjacent to each other close to the central axis of the stylus pen 690 with the non-conductive structure 613 interposed therebetween.

The stylus pen 690 has an internal detection circuit, and the output connectors 120 are connected to a connection terminal at the detection circuit. The stylus pen 690 also functions as a controller, and determines the presence or not of a set input according to the change in resistance value detected by the detection circuit. For instance, when the user presses the sensor section in the direction indicated by the white arrows, the stylus pen 690 determines that a click operation has been performed.

Figure 11:
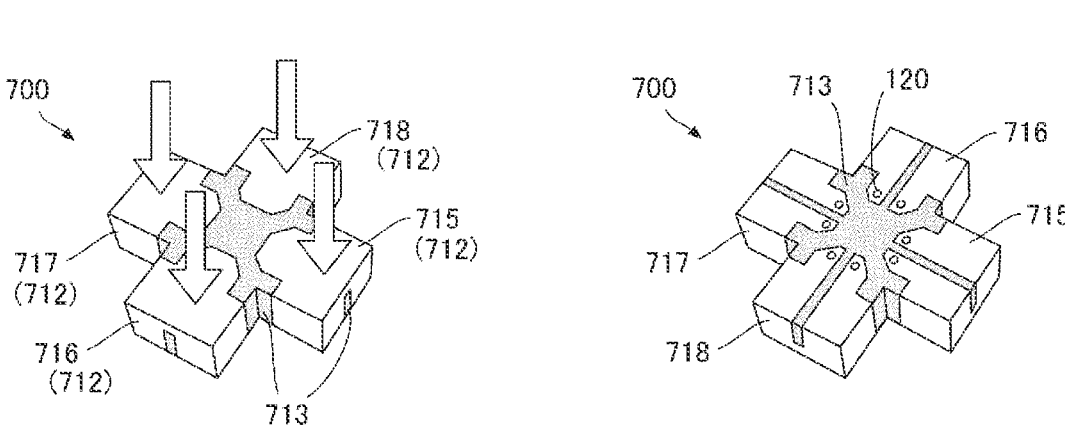
FIG. 11 is an overall view of the sensor according to a third application example.

FIG. 11 is an overall view of a sensor 700 according to a third application example. Specifically, FIG. 7(*a*) is an overall perspective view looking down on the upper surface, and FIG. 7(*b*) is an overall perspective view looking down on the lower surface. The sensor 700 has a crisscross shape as a whole and functions as a cross button with protruding portions in the four directions, each serving as an independent pressed portion.

In the sensor 700, the protruding portions in the four directions are mainly formed with conductive structures 712, and they are divided into a first conductive part 715, a second conductive part 716, a third conductive part 717, and a fourth conductive part 718, each of which is subject to compression. A non-conductive structure 713 is placed in the center of the cross so as to partition these conductive parts. In each conductive part, a non-conductive structure 713 is placed from the lower surface toward the upper surface so as to divide the conductive part in two in the protruding direction. On the lower surface of each conductive part, two output connectors 120 are placed adjacent to each other with the non-conductive structure 713, extending in the protruding direction, interposed therebetween. That is, the sensor 700 is connected to eight cables. The sensor 700 is connected to a detection circuit and a controller via cables (not shown) connected to the output connectors 120, and when each of the conductive parts is compressed in the direction indicated by the white arrows, the controller detects the change in the resistance value to determine which conductive part is pressed.

In addition to the application examples described above, the sensor according to the present embodiment is applicable in various ways. The sensor may be incorporated as at least part of the insole or sole of a shoe so that the sensor can detect weight shift (change in weighting) during walking. The sensor may be incorporated into a grip of a motorcycle, for example, so that the sensor detects the direction and amount of twisting of the grip by the driver to adjust the accelerator.

That is descriptions of some sensors according to the present embodiment, which can be modified in various ways as long as the sensor includes: a sensor section having a conductive structure with a three-dimensionally continuous unit lattices; and an output connector that outputs a resistance value that changes with compression of the sensor section. For instance, the unit lattices making up the conductive structure and the non-conductive structure may have different sizes and shapes. Each of the conductive and non-conductive structures may include a plurality of types of unit lattices combined, instead of single continuous unit lattices. For example, they may include unit lattices of the same shape but different sizes from each other.

The conductive and non-conductive structures may be colored differently from each other. For instance, the sensor section may have a hard material serving as a base that is embedded in the central portion. The output connector is not limited to a type that receives a connector pin, and may have a structure in which a lead wire is simply pulled out as long as it can output a resistance value to the detection circuit.

What is claimed is:

1. A sensor comprising:
a sensor section including a conductive structure made up of a pattern of three-dimensionally continuous unit lattices, each unit lattice being conductive and including a plurality of columnar beams; and
output connectors that output a resistance value of the sensor section, the resistance value changing at least when the conductive structure is compressed by an external force.

2. The sensor according to claim 1, wherein the conductive structure is adjacent to a non-conductive structure, in which the unit lattices are three-dimensionally continuous.

3. The sensor according to claim 2, wherein the non-conductive structure intervenes between two of the output connectors from an edge of the conductive structure toward an interior so that a distance of a conductive path between the two output connectors is longer than a distance of a conductive path without the non-conductive structure intervening.

4. The sensor according to claim 3, wherein the two output connectors are adjacent to each other on one face of the conductive structure with the non-conductive structure interposed therebetween.

5. The sensor according to claim 1, wherein each unit lattice includes the plurality of columnar beams, each radially extending from one point in the unit lattice toward a lattice point.

6. The sensor according to claim 1, wherein each unit lattice includes the plurality of columnar beams connecting adjacent lattice points to form a frame.

7. A method for manufacturing the sensor according to claim 1, comprising forming the sensor section by stacking using a 3D printer.

8. The sensor according to claim 1, wherein the sensor section has a cubic shape.

9. The sensor according to claim 1, wherein each unit lattice has a cubic shape.

10. The sensor according to claim 1, wherein the sensor section has a spherical shape.

11. The sensor according to claim 1, wherein the sensor section has a cylindrical shape.

12. The sensor according to claim 1, wherein the conductive structure is configured to deform in accordance with a magnitude of the external force.

13. The sensor according to claim 1, wherein the conductive structure has an elasticity to return to an original shape in response to the external force being removed.

14. The sensor according to claim 1, wherein the output connectors are arranged in gaps of the sensor section.

15. The sensor according to claim 1, wherein the output connectors are arranged on a lateral face of the sensor section, and wherein the external force is applied to a top surface of the sensor section.

16. The sensor according to claim 1, wherein the compression by the external force increases a contact area between the plurality of columnar beams.

17. The sensor according to claim 16, wherein the increase in contact area corresponds to an amount of the compression by the external force.

18. The sensor according to claim 1, further comprising a detection circuit configured to convert the resistance value to a corresponding digital signal.

19. The sensor according to claim 1, wherein the conductive structure is composed of thermoplastic polyurethane and a conductive filler.

20. The sensor according to claim 1, wherein the plurality of columnar beams comprises a set of one or more skeletal columnar beams and a set of one or more frame columnar beams.

* * * * *